(No Model.)   2 Sheets—Sheet 1.
H. F. HAYDEN.
VAPOR AND GAS GENERATING FURNACE FOR LOCOMOTIVES, &c.
No. 295,392.   Patented Mar. 18, 1884.
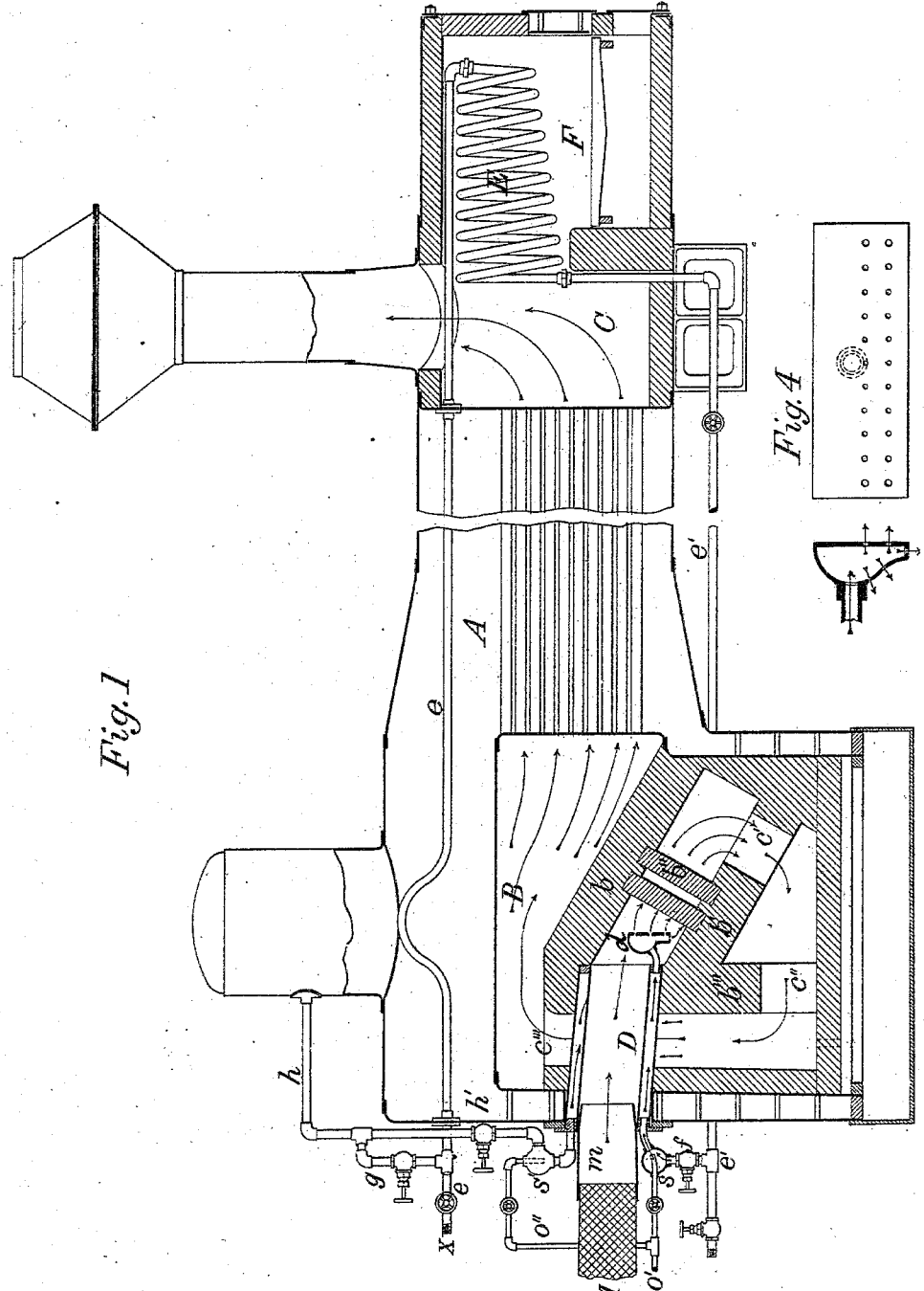
Witnesses:
Robt. H. Lamb
E. C. Stubbs
Inventor:
H. F. Hayden (No Model.) 2 Sheets—Sheet 2.
H. F. HAYDEN.
VAPOR AND GAS GENERATING FURNACE FOR LOCOMOTIVES, &c.
No. 295,392. Patented Mar. 18, 1884.
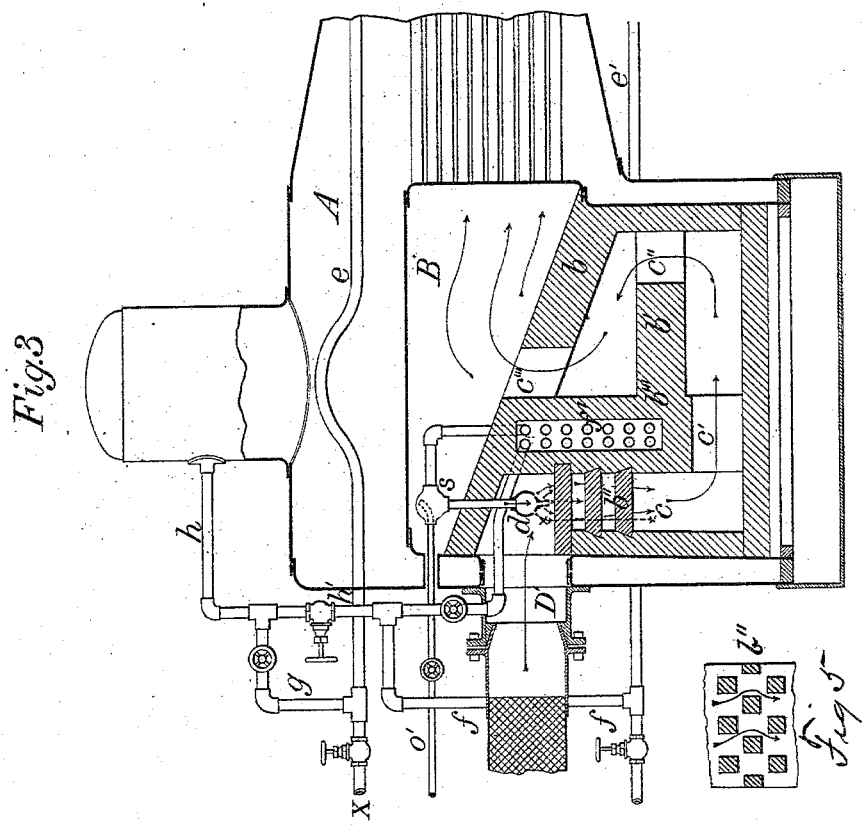
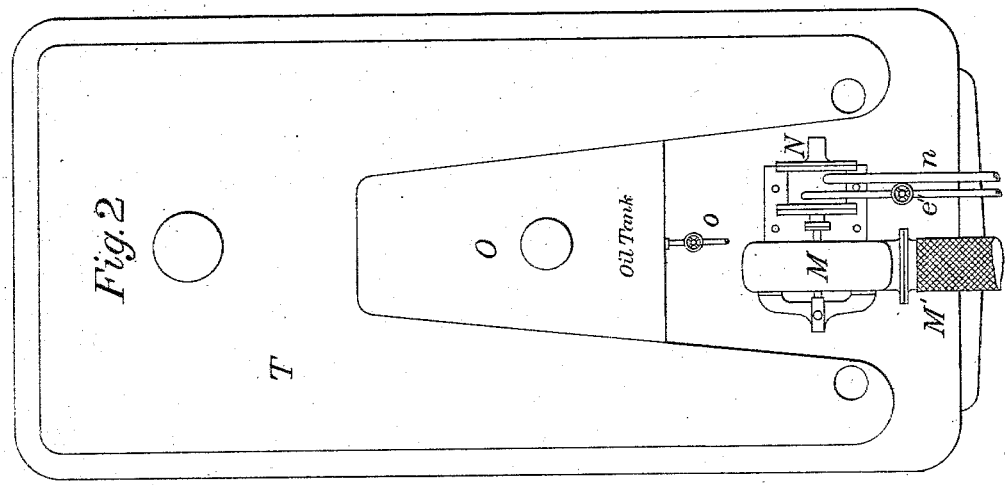
Witnesses: Inventor:
Robt. H. Lamb H. F. Hayden
E. C. Stubbs

UNITED STATES PATENT OFFICE.

HENRY F. HAYDEN, OF WASHINGTON, D. C., ASSIGNOR TO HIMSELF, JOHN A. LOGAN, OF ILLINOIS, AND JOHN T. MORGAN, OF ALABAMA.

VAPOR AND GAS GENERATING FURNACE FOR LOCOMOTIVES, &c.

SPECIFICATION forming part of Letters Patent No. 295,392, dated March 18, 1884.

Application filed March 20, 1883. (No model.)

*To all whom it may concern:*

Be it known that I, HENRY F. HAYDEN, a citizen of the United States, residing at Washington city, in the District of Columbia, have invented certain new and useful Improvements in Vapor and Gas Generating Furnaces for Locomotives and other Boilers; and I hereby declare the following to be a full, clear, and exact description of the same, reference being had to the accompanying drawings, in which—

Figure 1 is a longitudinal section of a locomotive boiler and furnace having my improvements applied. Fig. 2 is a plan view of a tender adapted for use with such a locomotive. Fig. 3 is a vertical longitudinal section of a fire-box, showing a modification. Fig. 4 is a detached view of the burner. Fig. 5 is a cross-section of the checker-work on the line $x\ x$, Fig. 3.

Like letters refer to like parts wherever they occur.

Attempts have been heretofore made to utilize liquid hydrocarbons in locomotive and other furnaces, but have failed of success for several reasons, viz: first, the difficulty of obtaining the initial heat necessary to produce or generate the gases or vapors and maintain them at a uniform pressure or volume; secondly, the inability to maintain the fire-box or furnace at a uniform high heat necessary to the complete combustion of the gases, &c.; thirdly, the lack of proper means for causing the thorough intermingling of the air and combustible gases; and, finally, want of such a construction as would prolong the contact of the intermingled air and gases within the fire-box and at a high temperature until complete combination of the elements, or, in other words, until complete combustion took place. These difficulties I have overcome, first, by lining the fire-box with refractory material and forming arches and tortuous passages therein; secondly, by the arrangement of the generators, combining chambers and burners within the refractory lined fire-box, where they will be subjected to uniform high temperatures; thirdly, by provision of one or more superheaters, and, finally, by certain details of construction, all of which will hereinafter more fully appear.

I will now proceed to describe my invention more specifically, so that others skilled in the art to which it appertains may apply the same.

In the drawings, A indicates a locomotive; B, the fire box or furnace, and C the smoke-box thereof. This furnace or fire-box B, I line with fire-brick or other refractory material, around the bottom, side, and ends, to prevent any contact between the products of combustion and the boiler-sheets, and to provide a heat-storing medium, and the central space I divide into tortuous passages by a series of refractory arches, $b\ b'$, and vertical walls $b'''$, through which are the ports $c'\ c''\ c'''$, as many as may be necessary. To still further break up and intermingle the gases in these tortuous passages, which I term the "combining-chambers," I may insert a series of rows or cross-bricks or checker-work, $b''$; and when such are employed they are preferably placed directly in front of the burner, in order to break up and intermingle the air and gases at at the commencement of their travel. The checker-work $b''$ may consist of two or more rows of spaced alternately-arranged bricks, as shown; or may be of any equivalent form which will produce zigzag channels, many forms of which are so well known that further description is unnecessary. By this arrangement of the interior of the fire-box, I obtain, first, an immense mass of refractory material to absorb and retain heat; secondly, the intimate intermingling of the air and gases within the fire-box, and their subsequent prolonged travel through the tortuous passages under high heat, so that perfect combination or perfect combustion ensues before the flame reaches the crown-sheets or boiler-tubes, by which time combustion being complete no carbon (or soot) can be formed or deposited on the crown-sheet or in the tubes.

Within the refractory brick-work of the furnace is placed the burner $d$, to which the combustible gases may be directly fed, if desired, (see Fig. 3,) but preferably an annular generator, D, is interposed between the gas-supply and the burner, as shown in Fig. 1. This burner $d$ is of general V-shape in cross-section, having a series of perforations below and two or more rows on one or both sides. These perforations increase in size uniformly from the center toward the ends, so as to form a uniform flow of the gas. The gas escapes in fine jets, and the burner is placed directly in front of the checker-work or cross-bricks $b''$, which further break up and disseminate the vapors.

D indicates the generator which I prefer to use. It consists of two hollow cylinders connected by annular heads, the space between the cylinders forming the generating-chamber, which connects directly with the burner $d$ at one end, and at the other with the hydrocarbon and steam supply, and the open passage through the central cylinder forming the air-inlet. This cylinder D, when used, is supported at its inner end on the vertical wall $b'''$, and at its outer end by the end wall (or rear wall) of the fire-box, and it opens into the space between the arches directly back of the burner. It will thus be seen that it is subjected to the highly-heated gases when combustion is most complete, and consequently the incoming air and vapors are subjected to the highest possible temperature. I wish here to state that the use of this generator is of incaluable value, as it enables me to maintain a volume of gas back of the burner, and consequently a uniform pressure at the burner; and it also enables me to effectually heat the incoming air, which supports combustion. It is well known that the nearer the combining air and gas are to the temperature of initial combustion the less liability there is of a deposit of carbon, the more complete is the final combustion, and the higher the temperature developed. For these reasons the generator is desirable, but owing to the peculiar construction of the fire-box it can be dispensed with and perfect combustion maintained, as, for instance, by the arrangement shown in Fig. 3.

$e$ indicates a steam-pipe, which extends through the steam-space of the boiler, projecting at either end, and in the extension of the smoke-box C, terminating in a superheating-coil, E, arranged in an auxiliary furnace, F. The superheating-coil should be of sufficient strength to resist rupture when used as a flasher to generate the steam necessary for starting the furnace. From this superheating-coil a steam-pipe, $e'$, extends forward along the side of the boiler to a point in front of the fire-box or furnace B, and at that point gives off a vertical branch, $f$, (provided with a suitable valve,) that delivers steam to the union-joint $s$, which communicates with the generator D or burner $d$. This steam-pipe $e$ is connected with the steam-space of the boiler by a branch pipe, $g$, having a suitable valve, and a pipe, $h$.

Before further describing the devices connected directly to the locomotive it will be necessary to specify those carried on the tender.

In Fig. 2 is shown a tender, which may be of the usual construction, with the ordinary or any approved water-tank, T. In the space usually occupied for coal I place the oil-tank O, and, if desired, I extend the same above and over the water-tank. In front of the oil-tank I place the fan M, and at one side thereof a small rotary or any other suitable engine, N, for driving the fan. $n$ is the exhaust-pipe of the engine. The fan I connect, by the flexible tubing M', with a nozzle, $m$, which fits into the generator D, before referred to, (see Fig. 1,) or into a suitable tube, D', arranged on the furnace B; and by this means the air-supply is provided. Superheated-steam pipe $e'$ of the locomotive is, by means of flexible tubing, coupled with steam-pipe $e''$, leading to the rotary engine N, and by this means steam to operate the engine and fan are obtained; or, if preferred, steam may be taken directly from the boiler after steam has been generated therein. For such a purpose the skilled mechanic could readily adapt suitable pipes and fittings. The oil-tank O is connected, through pipe $o$, provided with a suitable valve, and flexible connections, with pipe $o'$, (see Figs. 1 and 3,) which delivers the oil into union-joint $s$, where it meets the superheated steam from $f$, and the combined oil and steam pass into the annular generator D, and thence to burner $d$, or directly to burner $d$, as the case may be.

Thus I have described a complete system of the simplest and preferred form; but I have shown several adjuncts thereto, which I will next proceed to describe.

It may become desirable to supply the steam to the generator D or burner directly from the boiler A, in which case I extend the pipe $h$, (see Fig. 1,) as at $h'$, providing it with a suitable valve, into a second union-joint, $s'$, which connects with the generator D or burner $d$; and from the oil-pipe $o'$, I extend a valved branch, $o''$, and cause the same to enter the union-joint $s'$, so that by opening the valve in $h'$ and that in branch pipe $o''$ both oil and steam in regulated quantities can be fed to the generator or burner.

For some purposes it may be desirable to employ a supplemental or auxiliary superheater, in which case I prefer to make the vertical wall $b'''$ of the "combining-chamber" or refractory walls hollow, as shown in Fig. 3, and coil therein the branch pipe $f'$, leading the same thence to the union-joint $s$, which connects directly with the burner. By coupling the branch pipe $f$ with the branch extension $h'$ this superheater may, if desired, be connected directly with the steam-space of the boiler, so as to take steam therefrom.

The oil may be fed from the oil-tank O by elevating the tank and using the hydrostatic pressure by means of a pump operated from the rotary engine N, or by any other convenient means.

In order to start the devices, a small hand force-pump is connected to the pipe $e$ at X, and the valve in $e$ being opened water can be forced into the pipe $e$, and thence to the superheater E.

The devices, being substantially such as hereinbefore specified, will operate as follows: A fire is first made in an auxiliary furnace, F, and the superheating-coil E highly heated. The valve in pipe $e$ is then opened, and a small quantity of water is forced along pipe $e$ into the superheater E, where it is flashed into steam. The superheater-coil will be provided with the usual safety-valve, which will be placed near the small engine for operating the fan on the tender. As all the valves in pipes $e'$ are open, there will be no undue pressure in the superheater-coil. This steam is conducted by pipe $e'$ to the rotary engine N on the tender, which, being set in operation, actuates fan M and forces a blast of air through nozzle $m$ and generator D into the fire-box. The valve in branch pipe $f$ of pipe $e'$ is then opened, as also the valve in oil-pipe $o'$, and oil and steam meet in the union-joint $s$, and pass thence to the annular generator D and burner $d$. As the vaporized oil and steam issue from the burner they are ignited, and the inflamed mixture of air, steam, and vapor are forced through checker-work $b''$ and the tortuous passages formed by the several arches. The checker-work $b''$ causes a thorough mixing or intermingling of the gas, air, and steam, and the long tortuous passages insure complete combustion by the time the waste gases reach the space B or crown sheet and tubes. This is continued until the refractory brick arches and lining of the fire-box have attained a very high heat and steam has been raised in the boiler. Water is then no longer injected through $e$ by the hand-pump, but the same is disconnected, the valve closed, and the valve in pipe $g$ opened, so as to connect the pipe $e$ with the steam-space of the boiler. The superheater E now receives its steam from the boiler, and the generation of the gas becomes automatic, as the superheated steam from $e'$ actuates the engine N and it the fan M, and also passes by branch $f$ to the generator D, together with oil from the pipe $o'$.

If the first set of devices should become inoperative from any cause, or if it should be desirable to use an auxiliary set, the valve in branch oil-pipe $o''$ and the valve in branch steam-pipe $h'$ (see Fig. 1) can be opened, and oil, together with boiler-steam, will pass, by union-joint $s'$, to generator D and burner $d$. If an auxiliary superheater is required, the branch pipe $f$ of superheater-pipe $e$ may be coiled in the hollow vertical wall $b'''$ (see Fig. 3) of said auxiliary superheater, and may take its steam directly from the boiler in manner and by the means before specified.

The advantages of my invention are, first, that the products of combustion do not come in contact with the boiler-sheets until combustion is complete; consequently there is no deposit of soot or carbon, no loss of fuel, no waste of heat, and no oxidation or other injury to the boiler-sheets; secondly, the refractory mass absorbs heat and maintains a temperature in the fire-box most highly favorable to the complete union of the elements; thirdly, that the long tortuous passages favor the proper intermingling of the gases and vapors, and give time for perfect combination or complete combustion; and, finally, owing to the complete combustion, a pure flame is obtained, and one free from gases that will act on the boiler-sheets or injuriously affect the tubes.

With these improvements the contracted exhaust-nozzles to produce draft are not required, and all back pressure in the engine-cylinders is avoided, which will add much to the effective force of the engine. The exhaust-pipes can be made large and extend to the top of the stack. The air for combustion being supplied by the fan, the flame is forced gradually through the various chambers into the tubes, filling all the space with a uniform and intense heat.

Having thus described the nature and advantages of my invention, what I claim, and desire to secure by Letters Patent, is—

1. In furnaces for locomotives, a series of vertical and cross walls of refractory material arranged within a close fire-box, forming a compact heat-storer, and also increasing the length of the flame-flues within said box, in combination with checker-work arranged at the entrance of the flame-flues to break up and intermingle the air and gas, whereby the air and gas are brought into the proper relation and maintained at a proper temperature to insure complete combustion before reaching the boiler-sheets, substantially as and for the purposes specified.

2. In furnaces for locomotives, a series of vertical and cross walls of refractory material arranged within a close fire-box, forming a compact heat-storer, and also increasing the length of the flame-flues within said box, in combination with a superheater arranged in one of said vertical or cross walls, substantially as and for the purposes specified.

3. In a furnace for locomotives, the combination of a series of vertical and cross walls of refractory material arranged within a close fire-box, forming a compact heat-storer, and also increasing the length of the flame-flues within said box, a checker-work arranged at the entrance of the flame-flues to break up and intermingle the air and gas, and a burner arranged in front of the checker-work, substantially as and for the purpose specified.

4. In a fire-box, the combination of a series of refractory walls and arches arranged to form tortuous flame-passages, an annular generator arranged across the flame-passage and projecting into the mouth of the same, and a burner connected with the generator and arranged at the entrance of the flame-passage, substantially as and for the purpose specified.

5. In a furnace for locomotive-boilers, the combination of a series of vertical and cross walls of refractory material arranged within the close fire-box, forming a compact heat-storer, and also increasing the length of the flame-flues within said box, a burner arranged at the entrance of the flame-passage, a superheater, and a pipe leading therefrom, and an oil-supply pipe for supplying oil to the burner, substantially as and for the purposes specified.

6. In a furnace for locomotive and other boilers, the combination of a fire-box having a series of refractory walls and arches, forming tortuous flame-passages, an annular generator arranged across the flame-passage, and provided with a burner which projects into the flame-passage, a superheater provided with a pipe leading to the annular generator, an auxiliary furnace for the superheater, and an oil-supply pipe leading to the annular generator, substantially as and for the purpose specified.

7. In a furnace for locomotive and other boilers, the combination of a series of refractory walls and arches, arranged to form tortuous flame-passages, an annular generator arranged across and projecting into the flame-passages, a steam-pipe leading from the boiler to the generator, and an oil-supply-pipe leading into the steam-pipe, substantially as and for the purpose specified.

In testimony whereof I affix my signature, in presence of two witnesses, this 20th day of March, 1883.

HENRY F. HAYDEN.

Witnesses:
F. W. RITTER, Jr.,
H. B. MOULTON.